(12) United States Patent
Alakuijala et al.

(10) Patent No.: US 11,900,222 B1
(45) Date of Patent: Feb. 13, 2024

(54) EFFICIENT MACHINE LEARNING MODEL ARCHITECTURE SELECTION

(71) Applicant: Google LLC, Mountain View, CA (US)

(72) Inventors: Jyrki A. Alakuijala, Wollerau (CH); Quentin Lascombes de Laroussilhe, Zurichf (CH); Andrey Khorlin, Zurich (CH); Jeremiah Joseph Harmsen, Zurich (CH); Andrea Gesmundo, Zurich (CH)

(73) Assignee: Google LLC, Mountain View, CA (US)

( * ) Notice: Subject to any disclaimer, the term of this patent is extended or adjusted under 35 U.S.C. 154(b) by 546 days.

(21) Appl. No.: 16/355,185

(22) Filed: Mar. 15, 2019

(51) Int. Cl.
*G06N 20/00* (2019.01)
*G06N 3/08* (2023.01)

(52) U.S. Cl.
CPC ............... *G06N 20/00* (2019.01); *G06N 3/08* (2013.01)

(58) Field of Classification Search
CPC ......... G06N 20/00; G06N 3/08; G06N 3/0454
See application file for complete search history.

(56) References Cited

U.S. PATENT DOCUMENTS

| | | | | |
|---|---|---|---|---|
| 6,842,751 | B1* | 1/2005 | Vilalta | 706/14 |
| 2017/0132528 | A1* | 5/2017 | Aslan | G06N 20/00 |
| 2019/0095756 | A1* | 3/2019 | Agrawal | G06V 10/82 |

OTHER PUBLICATIONS

Leite, Rui, Pavel Brazdil, and Joaquin Vanschoren. "Selecting classification algorithms with active testing." International workshop on machine learning and data mining in pattern recognition. Springer, Berlin, Heidelberg, 2012. https://link.springer.com/content/pdf/10.1007%2F978-3-642-31537-4_10.pdf (Year: 2012).*

Elmahgiubi, Mohammed, et al. "Efficient algorithm selection for packet classification using machine learning." 2016 IEEE 21st International Workshop on Computer Aided Modelling and Design of Communication Links and Networks (CAMAD). IEEE, 2016. https://ieeexplore.ieee.org/abstract/document/7790325 (Year: 2016).*

(Continued)

*Primary Examiner* — Viker A Lamardo
*Assistant Examiner* — Michael H Hoang
(74) *Attorney, Agent, or Firm* — Honigman LLP; Brett A. Krueger

(57) ABSTRACT

Methods, systems, and apparatus, including computer programs encoded on a computer storage medium, for providing a machine learning model that is trained to perform a machine learning task. In one aspect, a method comprises receiving a request to train a machine learning model on a set of training examples; determining a set of one or more meta-data values characterizing the set of training examples; using a mapping function to map the set of meta-data values characterizing the set of training examples to data identifying a particular machine learning model architecture; selecting, using the particular machine learning model architecture, a final machine learning model architecture for performing the machine learning task; and training a machine learning model having the final machine learning model architecture on the set of training examples.

16 Claims, 4 Drawing Sheets

(56) References Cited

OTHER PUBLICATIONS

Thornton, Chris, et al. "Auto-WEKA: Combined selection and hyperparameter optimization of classification algorithms." Proceedings of the 19th ACM SIGKDD international conference on Knowledge discovery and data mining. 2013. https://dl.acm.org/doi/abs/10.1145/2487575.2487629 (Year: 2013).*
Parente, Regina R., Anne MP Canuto, and João C. Xavier. "Characterization measures of ensemble systems using a meta-learning approach." The 2013 International Joint Conference on Neural Networks (IJCNN). IEEE, 2013. https://ieeexplore.ieee.org/stamp/stamp.jsp?tp=&arnumber=6707016 (Year: 2013).*
Yu, Lean, Shouyang Wang, and Kin Keung Lai. "A neural-network-based nonlinear metamodeling approach to financial time series forecasting." Applied Soft Computing 9.2 (2009): 563-574. https://www.sciencedirect.com/science/article/pii/S156849460800118X (Year: 2009).*
Rivolli, Adriano, et al. "Towards reproducible empirical research in meta-learning." arXiv preprint arXiv:1808.10406 (2018): 32-52. https://arxiv.org/pdf/1808.10406v1.pdf (Year: 2018).*
Bürger, Fabian. An Automatic Representation Optimization and Model Selection Framework for Machine Learning. Diss. Dissertation, Duisburg, Essen, Universität Duisburg-Essen, 2016, 2016. https://core.ac.uk/download/pdf/44685559.pdf (Year: 2016).*
Elsken et al., "Neural Architecture Search: A Survey," Journal of Machine Learning Research, Jan. 2019, 20(55): 1-21.
Wikipedia [online], "Meta Learning," Wikipedia.org, available as early as Aug. 2005, retrieved on Dec. 27, 2019, URL <https://en.wikipedia.org/wiki/Meta_learning>, 4 pages.
Zoph and Le "Neural Architecture Search with Reinforcement Learning," arXiv: 1611.01578v2, Feb. 2017, 16 pages.

* cited by examiner

EFFICIENT MACHINE LEARNING MODEL ARCHITECTURE SELECTION

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that is configured to generate and provide a trained machine learning model in response to a request to train a machine learning model on a set of training data.

According to a first aspect there is provided a method performed by one or more data processing apparatus, the method including: receiving a request to train a machine learning model to perform a machine learning task on a set of training examples, where each training example includes a training input and a corresponding target output, and the target output represents an output that should be generated by processing the training input using the machine learning model; determining a set of one or more meta-data values characterizing the set of training examples; using a mapping function to map the set of meta-data values characterizing the set of training examples to data identifying a particular machine learning model architecture, wherein for each of multiple possible sets of meta-data values, the mapping function defines a predetermined mapping from the possible set of meta-data values to data identifying a corresponding machine learning model architecture; selecting, using the particular machine learning model architecture, a final machine learning model architecture for performing the machine learning task; and training a machine learning model having the final machine learning model architecture on the set of training examples.

In some implementations, for each training example: the training input of the training example includes an image, and the corresponding target output of the training example includes data defining a category of object depicted in the image.

In some implementations, the particular machine learning model architecture is a neural network architecture.

In some implementations, the set of meta-data values characterizing the set of training examples includes meta-data values characterizing one or more of: a number of training examples in the set of training examples, a data type of the training inputs, a data type of the training outputs, a dimensionality of the training inputs, or a complexity of the training inputs.

In some implementations, the meta-data value characterizing the complexity of the training inputs is based on a number of principal components required to reconstruct the training inputs with a predetermined level of accuracy.

In some implementations, the data identifying the particular machine learning model architecture includes data identifying one or more functions; and each of the functions is configured to process an input comprising one or more characteristics of the set of training examples to generate an output that defines one or more aspects of the particular machine learning model architecture.

In some implementations, the method further includes determining the mapping function before receiving the request to train a machine learning model on the set of training examples, comprising: obtaining a set of machine learning model architectures; obtaining multiple sets of training examples; and for each possible set of meta-data values, mapping the possible set of meta-data values to a corresponding machine learning model architecture that enables a given machine learning model having the corresponding machine learning model architecture to achieve a highest prediction performance on a set of training examples from the multiple sets of training examples that is characterized by the possible set of meta-data values.

In some implementations, obtaining multiple sets of training examples includes: obtaining one or more existing sets of training examples; and generating one or more new sets of training examples from the existing sets of training examples.

In some implementations, generating a new set of training examples from an existing set of training examples includes one or more of: (i) selecting a proper subset of the training examples in the existing set of training examples for inclusion in the new set of training examples, (ii) modifying training inputs from the existing set of training examples, and (iii) modifying target outputs from the existing set of training examples.

In some implementations, obtaining multiple sets of training examples includes: for each possible set of meta-data values, obtaining at least one set of training examples wherein meta-data values characterizing the set of training examples match the possible set of meta-data values.

In some implementations, selecting a final machine learning model architecture for performing the machine learning task includes: selecting the particular machine learning model architecture.

In some implementations, selecting a final machine learning model architecture for performing the machine learning task includes: identifying the final machine learning model architecture as an output of an automated architecture search technique that is initialized with the particular machine learning model architecture.

According to a second aspect, there is provided a system including: one or more computers; and one or more storage devices communicatively coupled to the one or more computers, where the one or more storage devices store instructions that, when executed by the one or more computers, cause the one or more computers to perform operations including the operations of the first aspect.

According to a third aspect there is provided one or more non-transitory computer storage media storing instructions that when executed by one or more computers cause the one or more computers to perform operations including the operations of the first aspect.

Particular embodiments of the subject matter described in this specification can be implemented so as to realize one or more of the following advantages.

The system described in this specification can exploit previously discovered knowledge about which machine learning model architectures perform well on which prediction tasks to select a machine learning model architecture for a new task. In particular, the system can construct a mapping function that maps a set of meta-data values characterizing a set of training examples to a corresponding machine learning model architecture that enables a machine learning model having the architecture to effectively perform the prediction task defined by the training examples. Given a new prediction task, the system described in this specification can be used to efficiently determine a machine learning model architecture appropriate that is appropriate for the prediction task. Therefore, the system described in this specification can reduce consumption of computational resources (e.g., memory and computing power) by reducing the need to test many different candidate machine learning model architectures to find a machine learning model architecture that is appropriate for a prediction task.

The system described in this specification efficiently characterizes a set of training examples using a set of categorical meta-data values that are descriptive of the set of training examples while having a much lower dimensionality than the set of training examples. Using categorical meta-data values to represent sets of training examples enables the system to construct a "simple" mapping function (e.g., that can be represented as a look-up table) that can map any of infinitely many possible sets of training examples to an appropriate machine learning model architecture. In contrast, directly mapping sets of training examples to corresponding machine learning model architectures (i.e., without the benefit of a set of categorical meta-data values characterizing the set of training examples) may require a more complex and computationally intensive mapping function.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
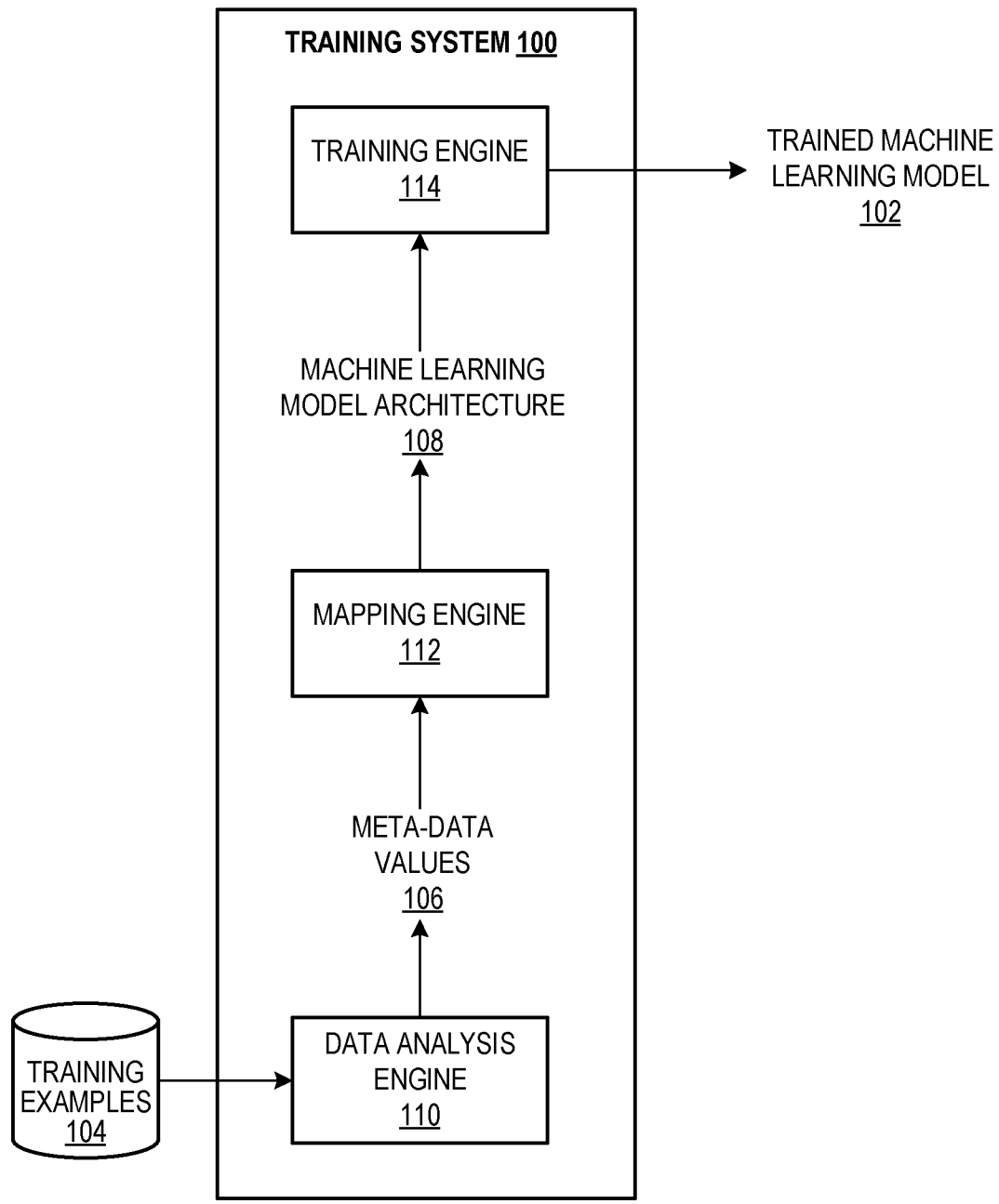
FIG. 1 shows an example training system.

FIG. 1 shows an example training system 100. The training system 100 is an example of a system implemented as computer programs on one or more computers in one or more locations in which the systems, components, and techniques described below are implemented.

The training system 100 is configured to generate and provide a trained machine learning model 102 in response to a request to train a machine learning model on a set of training examples 104. The system 100 determines an appropriate architecture for the machine learning model 102 by using a predetermined mapping to map a set of meta-data values 106 characterizing the training examples 104 to a corresponding machine learning model architecture 108. In particular, the system maps the meta-data values 106 to a machine learning model architecture 108 that is predicted to perform well on the prediction task defined by the training examples 104. That is, the system maps the meta-data values 106 to a machine learning model architecture 108 that is predicted to enable a machine learning model having the machine learning model architecture 108 to achieve an acceptable prediction accuracy in performing the prediction task defined by the training examples 104.

The architecture of a machine learning model refers to data defining the "type" and "structure" of the machine learning model, and optionally, the "training regime" to be used during training of the machine learning model, as will be described in more detail below. The architecture of a machine learning model is determined before the machine learning model is trained and is generally not adjusted during the training of the machine learning model. The architecture of a machine learning model should be understood to be distinct from data defining the values of trainable machine learning model parameters which are adjusted during training of the machine learning model.

The type of a machine learning model broadly classifies the form of the machine learning model. For example, possible types of machine learning models include: neural network models, random forest models, support vector machine models, and linear regression models.

The structure of a machine learning model defines the arrangement and operation of the parts of the machine learning model. For example, the structure of a neural network model refers to: the number of layers of the neural network, the operations performed by each of the layers (e.g., including the type of each of the layers), and the connectivity between the layers (i.e., which layers receive inputs from which other layers). Examples of possible types of neural network layers include, for example: fully-connected layers, convolutional layers, recurrent layers, and batch-normalization layers. As another example, the structure of a random forest model can refer to one or more of: a maximum (or predetermined) number of decision trees in the random forest, the maximum depth of each decision tree, the type of splitting function used at each node of the decision tree, the number of features used to determine the parameter values of the splitting function used at each node, and the fraction of the set of training examples used in training each decision tree.

The training regime to be used in training a machine learning model can refer to data specifying any aspect of how the machine learning model should be trained. For example, the training regime may specify a form of an objective function to be used in training the machine learning model. In a particular example, the machine learning model may be a neural network (or random forest), and the training regime may specify that the objective function to be used in training the neural network (or random forest) includes a cross-entropy (or Gini impurity) classification loss term. As another example, the training regime may specify a form of regularization to be used in training the machine learning model. In a particular example, the machine learning model may be a neural network, and the training regime may specify that dropout regularization should be performed during training of the neural network.

Each of the training examples 104 specifies a training input and a corresponding target output. The target output represents the output that should be generated by the machine learning model by processing the training input. The training inputs and the corresponding target outputs of the training examples 104 can be any appropriate type of digital data. For example, the training inputs may be images or features that have been extracted from images. In this example, the target output for a training input may be a given object category which describes an object that is depicted in the training input. As another example, the training inputs may be Internet resources (e.g., web pages), documents, or portions of documents or features extracted from Internet resources, documents, or portions of documents. In this example, the target output for a training input may define a topic of the training input. As another example, the training inputs may be pieces of text in a first language. In this example, the target output for a training input may be a piece of text in a second language that is a translation of the training input into the second language. As another example, the training inputs may be sequences of audio samples representing spoken utterances. In this example, the target output for a training input may be a piece of text that transcribes the spoken utterance.

In some implementations, rather than specifying training inputs and corresponding target outputs, the training examples 104 specify sequences of "experience tuples" that characterize the interaction of an agent with an environment over multiple time steps. Each experience tuple includes: (i) an observation characterizing a state of an environment at a respective time step, (ii) an action performed by the agent at the respective time step, (iii) a subsequent observation characterizing a subsequent state of the environment at a next time step, and (iv) a reward received as a result of the agent performing the action at the time step.

The system 100 can receive the training examples 104 in any of a variety of ways. For example, the system 100 can receive the training examples 104 as an upload from a remote user of the system over a data communication network, e.g., using an application programming interface (API) made available by the system 100.

The system 100 includes a data analysis engine 110, a mapping engine 112, and a training engine 114.

The data analysis engine 110 is configured to process the training examples 104 to determine a set of one or more meta-data values 106 characterizing the training examples 104. The meta-data 106 is generally descriptive of properties of the set of training examples 104 as a whole, and the prediction task the training examples 104 define, rather than being descriptive of properties of individual training examples. Generally, each of the meta-data values 106 is a categorical variable, that is, can assume only a finite number of possible values (as opposed to being a continuous variable, which can assume infinitely many possible values). The meta-data 106 can characterize any appropriate properties of the set of training examples 104. A few examples follow.

For example, the meta-data 106 may characterize the number of training examples in the set of training examples 104. In a particular example, the meta-data 106 may characterize whether the number of training examples in the set of training examples 104 falls into each of a predetermined number of intervals (e.g., 0-$10^3$ training examples, $10^3$-$10^6$ training examples, or >$10^6$ training examples). In this example, the meta-data 106 may include a respective categorical variable that can assume values in a set of possible values which each correspond to a respective interval.

As another example, the meta-data 106 may characterize the data type of the training inputs. In a particular example, the meta-data 106 may characterize whether the training inputs are text data, image data, audio data, or "other" data. In this example, the meta-data 106 may include a respective categorical variable that can assume values in a set of possible values which each correspond to a data type (e.g., text, image, audio, or other). In another particular example, the meta-data 106 may characterize whether the training inputs are composed of categorical variables, continuous variables, or a combination thereof. For example, if the training inputs are images, then the training inputs may be composed of continuous variables corresponding to the intensities of pixels in the images (e.g., which may be able to assume any value in a predetermined range).

As another example, the meta-data 106 may characterize the data type of the target outputs. In particular, the meta-data 106 may characterize whether the target outputs are categorical variables, continuous variables, or a combination thereof. In this example, the meta-data 106 may include a respective categorical variable that can assume values in a set of possible values which each correspond to a data type (e.g., categorical or continuous). In a particular example, if the training inputs are images, then the target outputs may be categorical variables corresponding to one of a finite number of object categories (i.e., which describe objects depicted in the images). In another particular example, if the training inputs define sequences of text, then the target outputs may define sequences of continuous variables corresponding to audio data values (i.e., which may be able to assume any value in a predetermined range) which represent verbalizations of the training inputs. If the target outputs are categorical variables, then the set of training examples 104 is said to define a "classification" prediction task, while if the target outputs are continuous variables, then the set of training examples 104 is said to define a "regression" prediction task.

As another example, the meta-data 106 may characterize the dimensionality of the training inputs. For example, if the training inputs are images, then the dimensionality of the training inputs may refer to the product of the number of rows and the number of columns in the images. As another example, if the training inputs are vectors, then the dimensionality of the training inputs may refer to the number of components in the vectors. In a particular example, the meta-data 106 may characterize whether the dimensionality of the training inputs falls into each of a predetermined number of intervals (e.g., 0-$10^2$ dimensions, $10^2$-$10^4$ dimensions, or >$10^4$ dimensions). In this example, the meta-data 106 may include a respective categorical variable that can assume values in a set of possible values which each correspond to a respective interval.

As another example, the meta-data 106 may characterize the "complexity" of the training inputs, that is, the amount of variability in the training inputs included in the training examples 104. For example, the meta-data 106 may characterize the number of principal components (i.e., as determined by a principal component analysis (PCA) procedure) required to reconstruct the set of training inputs with at least a predetermined level of accuracy (e.g., 95%). In a particular example, the meta-data 106 may characterize whether the number of principal components required to reconstruct the set of training inputs with at least the predetermined level of accuracy falls into each of a predetermined number of different intervals (e.g., 1-10 principal components, 10-100 principal components, or >100 principal components). In this example, the meta-data 106 may include a respective categorical variable that can assume values in a set of possible values which each correspond to a respective interval. In this example, requiring more principal components to reconstruct the set of training inputs with at least the predetermined level of accuracy may indicate that the training inputs are more complex (i.e., exhibit greater variability).

The set of meta-data values 106 characterizing the training examples 104 can be represented in any appropriate format, for example, as an ordered collection of categorical variables represented as a vector of numerical value (e.g., bits).

The mapping engine 112 is configured to map the set of meta-data values 106 to a machine learning model architecture 108 using a predetermined mapping (referred to herein as the "architecture mapping"). The architecture mapping defines a mapping from each possible set of meta-data values to a corresponding machine learning model architecture in a predetermined set of machine learning model architectures. The architecture mapping is configured to map a set of meta-data values characterizing a set of training examples to a corresponding machine learning model architecture that is predicted to enable a machine learning model having the machine learning model architecture to achieve an acceptable prediction accuracy after being trained on the training examples.

The architecture mapping may map a set of meta-data values to a "parametric" machine learning model architecture that is parametrized by one or more characteristics of the training examples. More specifically, in a parametric machine learning model architecture, the type, structure, or training regime of the architecture may be a function of one or more characteristics of the training examples. A few examples follow.

For example, the architecture mapping may map a set of meta-data values to a neural network architecture where the number of layers in the neural network architecture is specified as a function (e.g. a linear function) of the number of training examples.

As another example, the architecture mapping may map a set of meta-data values to a neural network architecture where the dimensionality of the layers in the neural network architecture are specified as a function of the dimensionality of the training inputs and the target outputs. In particular, the dimensionality of the input layer may be specified to match the dimensionality of the training inputs, and the dimensionality of the output layer may be specified to match the dimensionality of the target outputs.

As another example, the architecture mapping may map a set of meta-data values to a random forest architecture where the maximum depth of the decision trees in the random forest is a function (e.g., a linear function) of the complexity of the training inputs.

Mapping a set of meta-data values to a parametric machine learning model architecture enables the architecture mapping to flexibly tailor the machine learning model architecture to the specific characteristics of the set of training examples. For example, by parameterizing the number of layers of a neural network architecture as an increasing function of the number of training examples, the architecture mapping can mitigate the potential for over-fitting.

Figure 2:
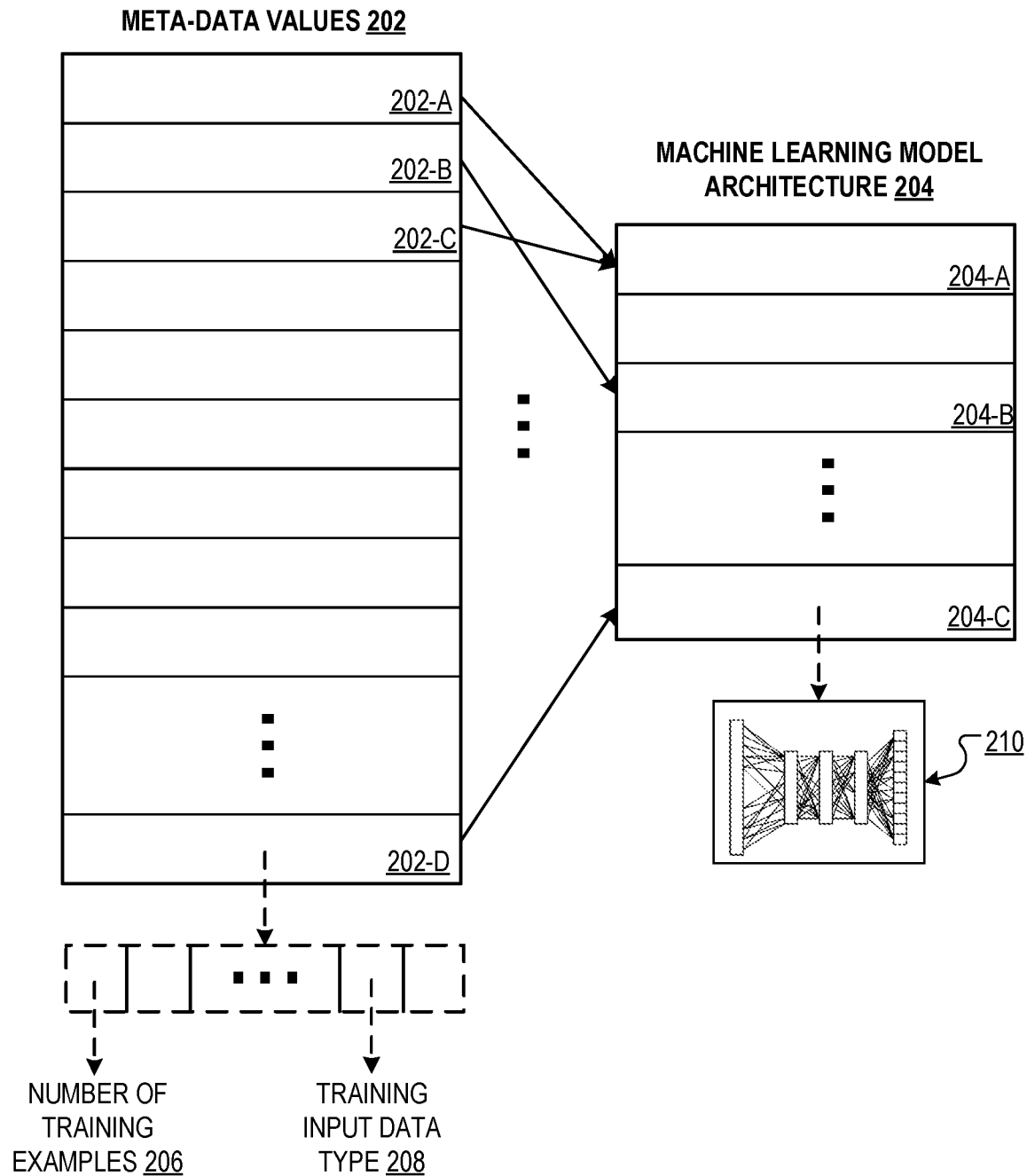
FIG. 2 is an illustration of an example architecture mapping.

An illustration of an example architecture mapping is depicted in FIG. 2. Example methods for determining the architecture mapping are described in more detail later.

The training engine 114 is configured to use the machine learning model architecture 108 (i.e., determined using the architecture mapping) to select a final machine learning model architecture for performing the machine learning task defined by the training examples 104. For example, the training engine 114 may directly identify the final machine learning model architecture as the machine learning model architecture 108. As another example, the training engine 114 may determine the final machine learning model architecture as the output of an automated architecture search technique that is initialized with the machine learning model architecture 108. Broadly, an automated architecture search technique trains multiple machine learning models having respective machine learning model architectures, starting from the machine learning model architecture used to initialize the search. After determining that an architecture search termination criterion is met (e.g., a predetermined number of machine learning models having respective machine learning model architectures have been trained), the search technique can output the best-performing machine learning model architecture (e.g., the architecture with the best prediction performance). A few examples follow.

For example, the training engine 114 may determine the final machine learning model architecture as the output of an evolutionary architecture search technique. In this example, the training engine 114 may initialize a "population" of machine learning model architectures based on the machine learning model architecture 108. For example, the training engine 114 may generate each initial machine learning model architecture by randomly "mutating" (i.e., changing an aspect of) the machine learning model architecture 108. In a particular example, the training engine 114 may mutate a neural network architecture by adding or removing layers, changing the connectivity between layers (e.g., by adding skip connections), or changing the amount of regularization used during training of the neural network (e.g., by adding or removing dropout layers). Thereafter, at each of multiple iterations, the training engine 114 selects a pair of architectures from the population and determines the respective prediction performance of each selected architecture (i.e., by training a machine learning model having the selected architecture on the training examples 104). The training engine 114 copies and mutates the architecture with better prediction performance to generate a new architecture which is added to the population, and removes the architecture with lower prediction performance from the population. Eventually, the evolutionary architecture search technique outputs the machine learning model architecture with the best prediction performance from among the machine learning model architectures in the current population.

The training engine 114 can determine the prediction performance of a machine learning model on the set of training examples 104 using any appropriate performance measure (e.g., area-under-curve (AUC) or F1 score). In some cases, the training engine 114 determines the prediction performance for the set of training examples 104 on a held-out validation set of the set of training examples 104.

As another example, the training engine 114 may determine the final machine learning model architecture using a "heuristic" architecture search technique. In this example, the training engine 114 iteratively adjusts the current machine learning model architecture (i.e., starting with the machine learning model architecture 108) based on its prediction performance on the training examples 104 using a predetermined set of "rules". For example, if the prediction performance of a current neural network architecture indicates that it is over-fitting, the training engine 114 may decrease the number of layers in the neural network architecture or increase the amount of regularization performed during training (e.g., by adding dropout layers). In this example, the training engine 114 may determine the neural network architecture is over-fitting if the prediction accuracy on a held-out validation set of training examples is substantially lower than the prediction accuracy on the training examples used in training the neural network architecture. Eventually, the heuristic architecture search technique outputs the machine learning model architecture with the best prediction performance.

Training a machine learning model refers to determining values of machine learning model parameters which enable the machine learning model to process the training inputs to generate outputs that match the corresponding target outputs specified by the training examples. That is, training the machine learning model refers to determining values of the machine learning model parameters which enable the machine learning model to effectively perform the prediction task defined by the training examples. Alternatively, if the training examples are sequences of experience tuple trajectories, the training engine 114 may train the machine learning model using reinforcement learning techniques to generate action selection outputs that maximize a cumulative measure of reward received by an agent interacting with the environment by performing actions specified by the action selection outputs. The training engine 114 may continue training a machine learning model until the training engine 114 determines that a training termination criterion is met. A few examples follow.

For example, the machine learning model may be a neural network, in which case the machine learning model parameters refer to the trainable parameters of the neural network, including the weights of the neural network. The training engine 114 may train the neural network by iteratively adjusting the values of the neural network parameters over a sequence of multiple training iterations using any appropriate neural network training technique, for example, stochastic gradient descent. The training engine 114 may determine that a training termination criterion is met once a predetermined number of training iterations have been performed, or once the prediction accuracy of the neural network on a held-out set of "validation" training examples achieves a maximum value.

As another example, the machine learning model may be a random forest, in which case the machine learning model parameters refer to data including the parameters of the splitting functions used at each node of each decision tree in the random forest. The training engine 114 may train the random forest by training a set of multiple decision trees. Training a decision tree refers to determining the number of nodes in the decision tree, the parent-child relationships between the nodes in the decision tree, and the values of the parameters of the splitting functions used at each node in the decision tree. The training engine 114 may determine that a training termination criterion is met once a predetermined number of decision trees have been trained.

The system 100 provides a trained machine learning model 102 having the final machine learning model architecture in response to the request to train a machine learning model on the set of training examples 104. The system 100 may provide the trained machine learning model 102 to a user of the system by, for example, transmitting data defining the trained machine learning model 102 to the user over a data communication network. The user may access the trained machine learning model 102 through an API made available by the system 100. Alternatively, rather than providing data defining the trained machine learning model 102 directly to a user, the system may enable the user (e.g., through an API) to provide new inputs to be processed by the trained machine learning model 102. The system may process the new inputs using the trained machine learning model to generate corresponding outputs, and thereafter provide the outputs to the user of the system (e.g., through an API).

The system 100 can determine the architecture mapping used by the mapping engine 112 to map sets of meta-data values to corresponding machine learning model architectures in any appropriate manner. For example, to determine the architecture mapping, the system 100 may obtain a set of machine learning model architectures. Some or all of the machine learning model architectures may have been previously determined as appropriate for performing one or more prediction tasks. The machine learning model architectures may have been manually engineered by humans, generated as the outputs of automated architecture search techniques, or determined in any other appropriate manner. In some cases, the machine learning model architectures are all of the same type (e.g., all neural networks), while in other cases, different machine learning model architectures may be of different types (e.g., some might be neural networks, while others might be SVMs).

In addition to obtaining the set of machine learning model architectures, the system 100 obtains multiple sets of training examples. In particular, for each possible set of meta-data values (of which there are finitely many due to the meta-data values being categorical variables), the system 100 obtains at least one set of training examples having characteristics that match the possible set of meta-data values. The system 100 can obtain the sets of training examples from any appropriate source. For example, the system 100 can obtain publicly available sets of training examples, such as the ImageNet image classification training examples. As another example, the system 100 can "synthesize" new sets of training examples by modifying existing sets of training examples. A few examples of synthesizing new sets of training examples follow.

For example, the system 100 can synthesize a new set of training examples by selecting a proper subset of an existing set of training examples for inclusion in the new set of training examples. In a particular example, the system may select, for inclusion in a new set of training examples, only those training examples in an existing set of training examples which have target outputs that are included in a proper subset of the set of possible target output values. For example, if the set of possible target output values is {A, B, C, D, E}, then the system 100 may select, for inclusion in the new set of training examples, only those training examples in the existing set of training examples which have target outputs that are included in the set {A, C, E}.

As another example, the system 100 can synthesize a new set of training examples by modifying the training inputs of an existing set of training examples. For example, the system 100 can increase the complexity of an existing set of training examples by adding random noise values to the training inputs of the existing set of training examples. As another example, the system 100 can reduce the complexity of an existing set of training examples by representing each training input using a number of principal components that is substantially less than the dimensionality of the training inputs.

As another example, the system 100 can synthesize a new set of training examples by modifying the target outputs in an existing set of training examples. For example, the system 100 can modify the target outputs in an existing set of training examples that define a regression prediction task to synthesize a new set of training examples that define a classification prediction task. As described earlier, in a regression prediction task, the target outputs are continuous variables, which in a classification prediction task, the target outputs are categorical variables. In a particular example, the system 100 can bin the continuous target outputs of the existing set of training examples (i.e., that define a regression prediction task) into a set of intervals that define categorical target outputs for the new set of training examples (i.e., that define a classification prediction task).

The system 100 can determine the architecture mapping using: (i) the set of machine learning model architectures, and (ii) the multiple sets of training examples. For example, for each set of meta-data values, the system can identify a respective "best-performing" machine learning model architecture from the set of machine learning model architectures. More specifically, for each machine learning model architecture, the system can train a machine learning model having the model learning model architecture on a set of training examples characterized by the set of meta-data values. Thereafter, the system can determine a prediction performance of the trained machine learning model on the set of training examples. The system can identify the best-performing machine learning model architecture for the set of meta-data values as the machine learning model architecture with the highest corresponding prediction performance on the set of training examples characterized by the set of meta-data values. After identifying the best-performing machine learning model architecture for the set of meta-data values, the system can map the set of meta-data values to the best-performing machine learning model architecture.

In some cases, the system may obtain multiple given sets of training examples which are each characterized by the same given set of meta-data values. To determine the best-performing machine learning model architecture for the given set of meta-data values, for each machine learning model architecture, the system can determine a respective prediction performance achieved by the machine learning model architecture for each of the given sets of training examples. Thereafter, the system can determine an average prediction performance for each machine learning model architecture as an average of the prediction performances achieved by the machine learning model architecture for each of the given sets of training examples. The system can identify the best-performing machine learning model for the given set of meta-data values as the machine learning model architecture with the highest corresponding average prediction performance on the given sets of training examples which are characterized by the given set of meta-data values. As before, after identifying the best-performing machine learning model architecture for the given set of meta-data values, the system can map the given set of meta-data values to the best-performing machine learning model architecture.

FIG. 2 is an illustration of an example architecture mapping. As described earlier, the architecture mapping defines a mapping from possible sets of meta-data values 202 to respective machine learning model architectures 204. In this example, the architecture mapping maps the sets of meta-data values 202-A, 202-B, 202-C, and 202-D to the respective machine learning model architectures 204-A, 204-B, 204-A, and 204-C. The set of meta-data values 202-D characterizes the number of training examples 206 and the training input data type 208 of a set of training examples. The architecture mapping maps the set of meta-data values 202-D to a neural network architecture 210.

As described earlier, a set of meta-data values characterizing a set of training examples can be represented as an ordered collection of categorical variables (e.g., a vector or matrix of categorical variables). Each of the categorical variables may characterize a respective property of the set of training examples. The data identifying a (collection of one or more) machine learning model architectures may be represented in any appropriate format, for example, as an ordered collection of numerical values (e.g., a vector or matrix of numerical values).

Figure 3:
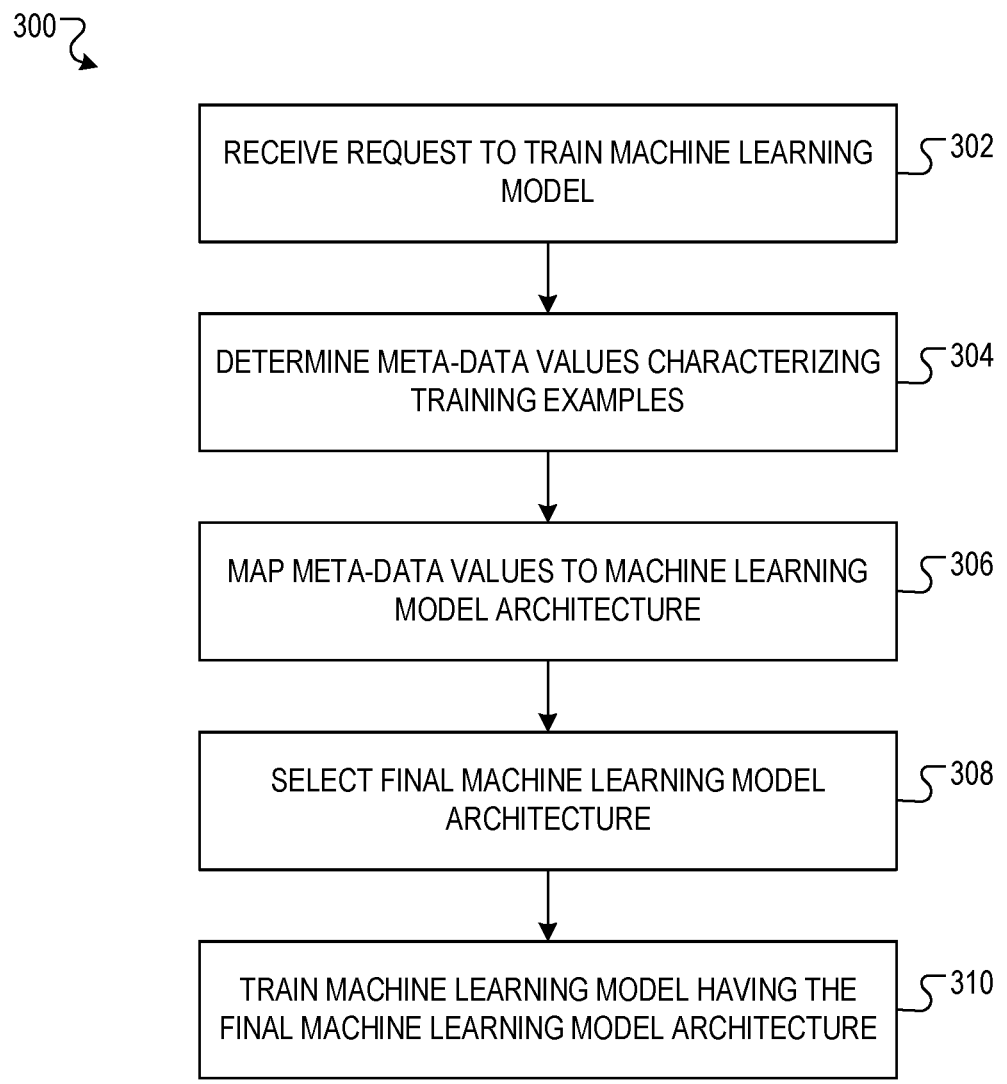
FIG. 3 is a flow diagram of an example process for generating a trained machine learning model in response to a request to train a machine learning model on a set of training examples.

FIG. 3 is a flow diagram of an example process 300 for generating a trained machine learning model in response to a request to train a machine learning model on a set of training examples. For convenience, the process 300 will be described as being performed by a system of one or more computers located in one or more locations. For example, a training system, e.g., the training system 100 of FIG. 1, appropriately programmed in accordance with this specification, can perform the process 300.

The system receives a request to train a machine learning model on a set of training examples (302). Each training example includes a training input and a corresponding target output that represents the output that should be generated by processing the training input using the machine learning model. The system can receive the training examples in any of a variety of ways. For example, as described earlier, the system can receive training examples as an upload from a remote user of the system over a data communication network, e.g., using an API made available by the system.

The system determines a set of one or more meta-data values characterizing the set of training examples (304). As described earlier, the meta-data values are categorical variables that are generally descriptive of properties of the set of training examples as a whole and the prediction task defined by the set of training examples. For example, the meta-data values may characterize properties of the set of training examples including one or more of: the number of training examples, the data type of the training inputs (e.g., text, image, or audio), the data type of the target outputs (e.g., categorical or continuous), the dimensionality of the training inputs, and the complexity of the training inputs.

The system uses a mapping function to map the set of meta-data values characterizing the set of training examples to data identifying a particular machine learning model architecture (306). For each of multiple possible sets of meta-data values, the mapping function defines a predetermined mapping from the possible set of meta-data values to data identifying a corresponding machine learning model architecture. An example process for determining the mapping function is described in more detail with reference to FIG. 4. The particular machine learning model architecture defines the type and structure of a machine learning model, and optionally, the training regime to be used in training the machine learning model.

In some cases, the mapping function may map the set of meta-data values to a parametric machine learning model architecture that is parameterized by one or more characteristics of the training data. More specifically, one or more aspects of the machine learning model architecture (e.g., the dimensionality of neural network layers) may be expressed as a function (e.g., a linear function) of one or more characteristics of the training data (e.g., the dimensionality of the training inputs and the training outputs). In these cases, to determine the machine learning model architecture, the system evaluates the functions parametrizing aspects of the machine learning model architecture on the relevant characteristics of the training data.

The system selects a final machine learning model architecture using the particular machine learning model architecture identified using the mapping function (308). For example, the system may directly identify the final machine learning model architecture as the particular machine learning model architecture identified using the mapping function. As another example, the system may determine the final machine learning model architecture as the output of an automated architecture search technique (e.g., an evolutionary or a heuristic architecture search technique) that is initialized with the particular machine learning model architecture identified using the mapping function.

The system trains a machine learning model having the final machine learning model architecture on the set of training examples (310). In some cases, the system may have already trained a machine learning model having the final machine learning model architecture during the process of selecting the final machine learning model architecture. The system can provide the trained machine learning model having the final machine learning model architecture in response to the request.

Figure 4:
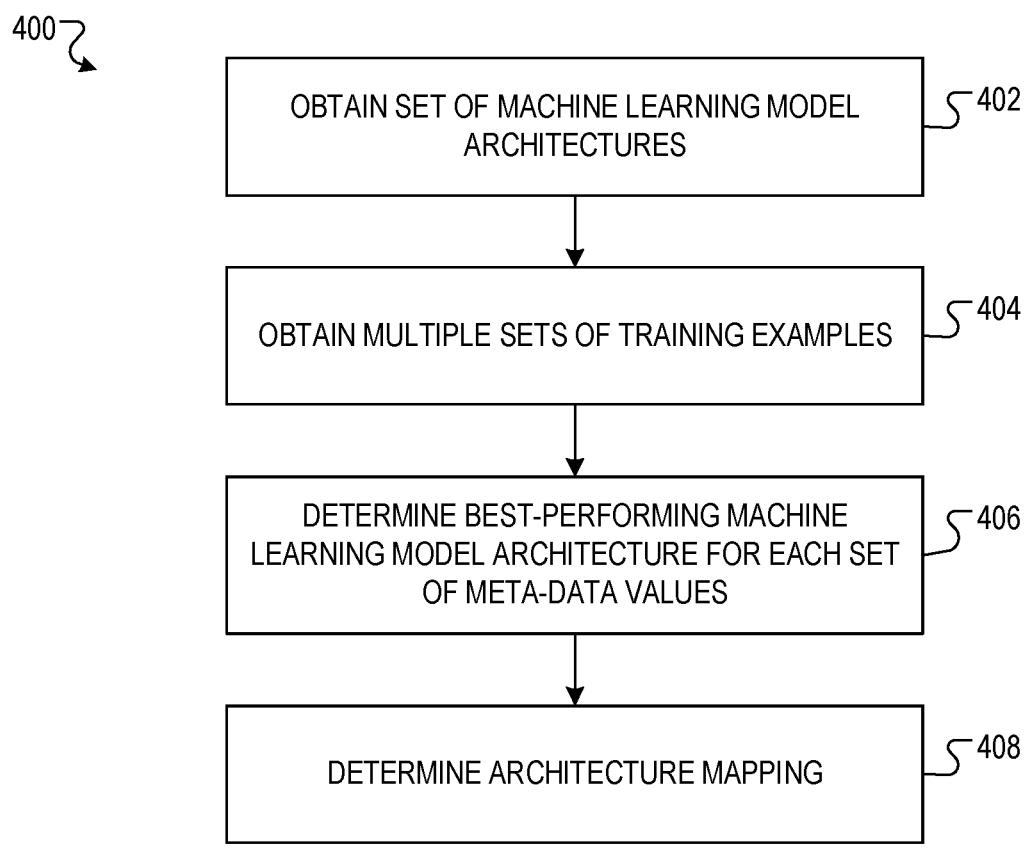
FIG. 4 is a flow diagram of an example process for determining an architecture mapping from possible sets of meta-data values to corresponding machine learning model architectures.

FIG. 4 is a flow diagram of an example process 400 for determining an architecture mapping from possible sets of meta-data values to corresponding machine learning model architectures. For convenience, the process 400 will be described as being performed by a system of one or more computers located in one or more locations. For example, a training system, e.g., the training system 100 of FIG. 1, appropriately programmed in accordance with this specification, can perform the process 400.

The system obtains a set of machine learning model architectures (402). The machine learning model architectures may have been manually engineered by humans, generated as the outputs of automated architecture search techniques, or determined in any other appropriate manner.

The system obtains multiple sets of training examples (404). In particular, for each possible set of meta-data values, the system obtains at least one set of training examples having characteristics that match the possible set of meta-data values. The system can obtain the sets of training examples from any appropriate source, for example, by obtaining existing (e.g., publicly available) sets of training examples, or by synthesizing new sets of training examples by modifying existing sets of training examples. The system can synthesize a new set of training examples from an existing set of training examples in any appropriate manner. For example, the system can synthesize a new set of training examples by: (i) selecting a proper subset of the training examples in an existing set of training examples for inclusion in the new set of training examples, (ii) modifying the training inputs in an existing set of training examples, (iii) modifying the target outputs in an existing set of training examples, or (iv) a combination thereof For each set of meta-data values, the system identifies a respective "best-performing" machine learning model architecture from the set of machine learning model architectures for the set of meta-data values (406). The system can identify the best performing machine learning model architecture for a set of meta-data values as the machine learning model architecture that achieves the highest prediction performance on a set of training examples (i.e., obtained in step 404) that is characterized by the set of meta-data values. In some cases, the system may obtain multiple sets of training examples which are each characterized by the same given set of meta-data values. The system can identify the best-performing machine learning model architecture for the given set of meta-data values as the architecture that achieves the highest average prediction performance on the given sets of training examples characterized by the given set of meta-data values.

The system determines the architecture mapping based on the best-performing machine learning model architecture for each set of meta-data value (408). In particular, the system maps each set of meta-data values to the best-performing machine learning model architecture for the set of meta-data values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   receiving a request to train a machine learning model to perform a machine learning task on a set of training examples, wherein each training example comprises a training input and a corresponding target output, and the corresponding target output represents an output that should be generated by processing the training input using the machine learning model;
   determining a set of one or more meta-data values characterizing attributes of the set of training examples, the attributes comprising a complexity of the training inputs, the complexity of the training inputs based on a number of principal components required to reconstruct the training inputs with a predetermined level of accuracy;
   receiving a predetermined set of machine learning model architectures, each machine learning model architecture in the predetermined set of machine learning model architectures represented by a respective function parameterized by the complexity of the training inputs such that the respective parameterized function has one or more parameters corresponding to the complexity of the training inputs;
   determining, using a mapping function mapping each of the set of one or more meta-data values characterizing the attributes of the set of training examples to one or more of the machine learning model architectures of the predetermined set of machine learning model architectures based on the respective parameterized function of each of the one or more of the machine learning model architectures, a particular machine learning model architecture by mapping each of the set of one or more meta-data values characterizing the attributes of the set of training examples to a random forest architecture, wherein a maximum depth of a decision tree in the random forest architecture is parameterized based on the complexity of the training inputs;
   selecting, using the particular machine learning model architecture, a final machine learning model architecture for performing the machine learning task; and
   training a machine learning model having the final machine learning model architecture on the set of training examples.

2. The method of claim 1, wherein for each training example:
   the training input of the training example comprises an image, and
   the corresponding target output of the training example comprises data defining a category of object depicted in the image.

3. The method of claim 1, wherein the particular machine learning model architecture is a neural network architecture.

4. The method of claim 1, wherein each respective function of each machine learning model architecture in the predetermined set of machine learning model architectures is configured to process an input comprising one or more characteristics of the set of training examples to generate an output that defines one or more aspects of the particular machine learning model architecture.

5. The method of claim 1, further comprising determining the mapping function before receiving the request to train a machine learning model on the set of training examples, comprising:
   obtaining a set of machine learning model architectures;
   obtaining a plurality of sets of training examples; and
   for each possible set of meta-data values, mapping the possible set of meta-data values to a corresponding machine learning model architecture that enables a given machine learning model having the corresponding machine learning model architecture to achieve a highest prediction performance relative to each other possible set of meta-data values on a set of training examples from the plurality of sets of training examples that is characterized by the possible set of meta-data values.

6. The method of claim 5, wherein obtaining a plurality of sets of training examples comprises:
   obtaining one or more existing sets of training examples; and
   generating one or more new sets of training examples from the existing sets of training examples.

7. The method of claim 6, wherein generating a new set of training examples from an existing set of training examples comprises: (i) selecting a proper subset of the training examples in the existing set of training examples for inclusion in the new set of training examples; (ii) modifying training inputs from the existing set of training examples; and (iii) modifying target outputs from the existing set of training examples.

8. The method of claim 5, wherein obtaining a plurality of sets of training examples comprises, for each possible set of meta-data values, obtaining at least one set of training examples wherein meta-data values characterizing the set of training examples match the possible set of meta-data values.

9. The method of claim 1, wherein selecting a final machine learning model architecture for performing the machine learning task comprises selecting the particular machine learning model architecture.

10. The method of claim 1, wherein selecting a final machine learning model architecture for performing the machine learning task comprises identifying the final machine learning model architecture as an output of an automated architecture search technique that is initialized with the particular machine learning model architecture.

11. A system comprising:
    one or more computers; and
    one or more storage devices communicatively coupled to the one or more computers, wherein the one or more storage devices store instructions that, when executed by the one or more computers, cause the one or more computers to perform operations comprising:
      receiving a request to train a machine learning model to perform a machine learning task on a set of training examples, wherein each training example comprises a training input and a corresponding target output, and the corresponding target output represents an output that should be generated by processing the training input using the machine learning model;

determining a set of one or more meta-data values characterizing attributes of the set of training examples, the attributes comprising a complexity of the training inputs, the complexity of training inputs based on a number of principal components required to reconstruct the training inputs with a predetermined level of accuracy;

receiving a predetermined set of machine learning model architectures, each machine learning model architecture in the predetermined set of machine learning model architectures represented by a respective function parameterized by the complexity of the training inputs such that the respective parameterized function has one or more parameters corresponding to the complexity of the training inputs;

determining, using a mapping function mapping each of the set of one or more meta-data values characterizing the attributes of the set of training examples to one or more of the machine learning model architectures of the predetermined set of machine learning model architectures based on the respective parameterized function of each of the one or more of the machine learning model architectures, a particular machine learning model architecture by mapping each of the set of one or more meta-data values characterizing the attributes of the set of training examples to a random forest architecture, and wherein a maximum depth of a decision tree in the random forest architecture is parameterized based on the complexity of the training inputs;

selecting, using the particular machine learning model architecture, a final machine learning model architecture for performing the machine learning task; and training a machine learning model having the final machine learning model architecture on the set of training examples.

12. The system of claim 11, wherein for each training example:

the training input of the training example comprises an image, and the corresponding target output of the training example comprises data defining a category of object depicted in the image.

13. The system of claim 11, wherein the particular machine learning model architecture is a neural network architecture.

14. One or more non-transitory computer storage media storing instructions that when executed by one or more computers cause the one or more computers to perform operations comprising:

receiving a request to train a machine learning model to perform a machine learning task on a set of training examples, wherein each training example comprises a training input and a corresponding target output, and the corresponding target output represents an output that should be generated by processing the training input using the machine learning model;

determining a set of one or more meta-data values characterizing attributes of the set of training examples, the attributes comprising a complexity of the training inputs, the complexity of training inputs based on a number of principal components required to reconstruct the training inputs with a predetermined level of accuracy;

receiving a predetermined set of machine learning model architectures, each machine learning model architecture in the predetermined set of machine learning model architectures represented by a respective function parameterized by the complexity of the training inputs such that the respective parameterized function has one or more parameters corresponding to the complexity of the training inputs;

determining, using a mapping function mapping each of the set of one or more meta-data values characterizing the attributes of the set of training examples to one or more of the machine learning model architectures of the predetermined set of machine learning model architectures based on the respective parameterized function of each of the one or more of the machine learning model architectures, a particular machine learning model architecture by mapping each of the set of one or more meta-data values characterizing the attributes of the set of training examples to a random forest architecture, wherein a maximum depth of a decision tree in the random forest architecture is parameterized based on the complexity of the training inputs;

selecting, using the particular machine learning model architecture, a final machine learning model architecture for performing the machine learning task; and training a machine learning model having the final machine learning model architecture on the set of training examples.

15. The non-transitory computer storage media of claim 14, wherein for each training example:

the training input of the training example comprises an image, and the corresponding target output of the training example comprises data defining a category of object depicted in the image.

16. The non-transitory computer storage media of claim 14, wherein the particular machine learning model architecture is a neural network architecture.

* * * * *